Figure 1:
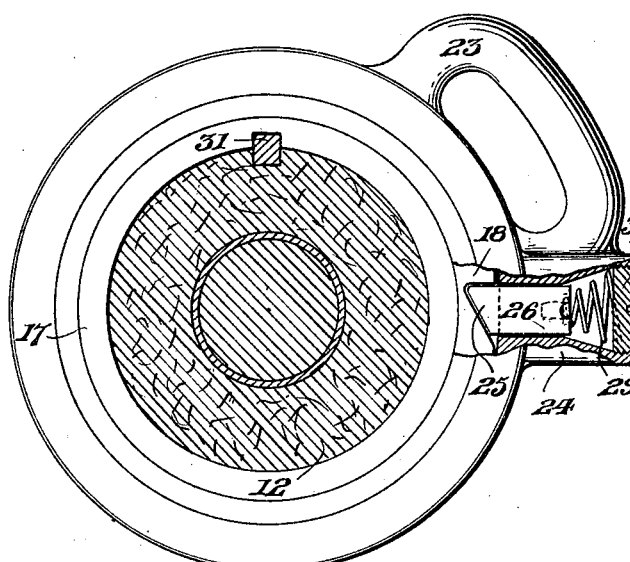

J. K. SKINDER.
HORSE HITCHING DEVICE.
APPLICATION FILED MAY 19, 1919.

1,323,725.

Patented Dec. 2, 1919.
2 SHEETS—SHEET 1.

Inventor
J. K. Skinder

By N. M. Wilson
Attorney

J. K. SKINDER.
HORSE HITCHING DEVICE.
APPLICATION FILED MAY 19, 1919.

1,323,725.

Patented Dec. 2, 1919.
2 SHEETS—SHEET 2.

Inventor
J. K. Skinder

By A. M. Wilson
Attorney

UNITED STATES PATENT OFFICE.

JOSEPH K. SKINDER, OF KENOSHA, WISCONSIN.

HORSE-HITCHING DEVICE.

1,323,725.	Specification of Letters Patent.	Patented Dec. 2, 1919.

Application filed May 19, 1919. Serial No. 298,282.

*To all whom it may concern:*

Be it known that I, JOSEPH K. SKINDER, a citizen of Poland, having declared my intention to become a citizen of the United States of America, residing at Kenosha, in the county of Kenosha and State of Wisconsin, have invented certain new and useful Improvements in Horse-Hitching Devices, of which the following is a specification.

The primary object of the present invention is to provide a horse hitching device in the form of a ratchet lock member that is adapted to be secured to the hub of a wheel and to have a strap connection with the bridle portion of a harness whereby when the device is set in operative position, forward movement of the vehicle will cause a tightening and subsequent winding movement of the connecting strap thereby to draw upon the bridle of the harness and cause the head of the horse to be rearwardly drawn to prevent a forward movement of the vehicle.

With the above and other objects in view, the invention consists in the novel form, combination and arrangement of parts hereinafter more fully described and shown in the accompanying drawings, in which like reference characters indicate similar parts throughout the several views.

Figure 2:
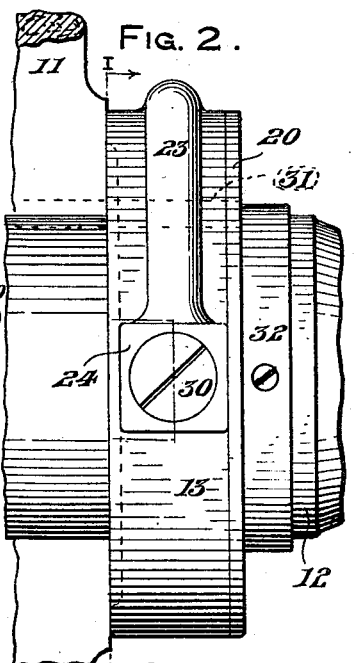
Figure 3:
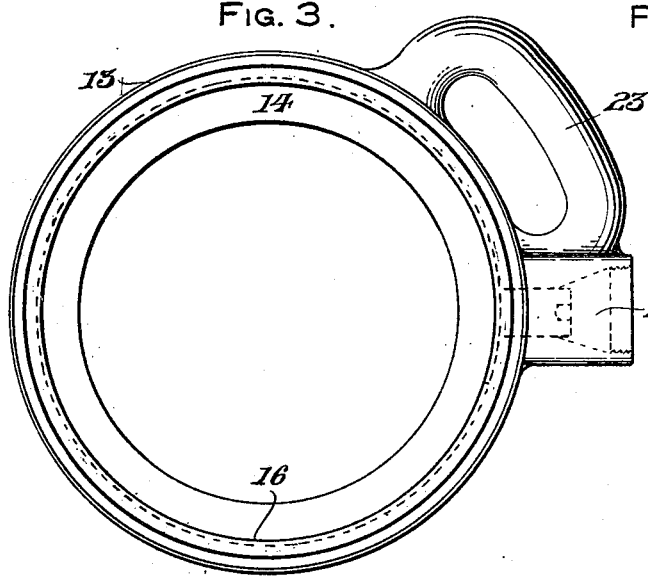
Figure 4:
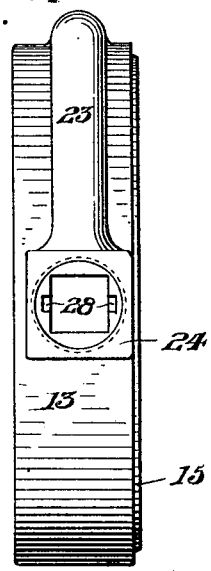
Figure 5:
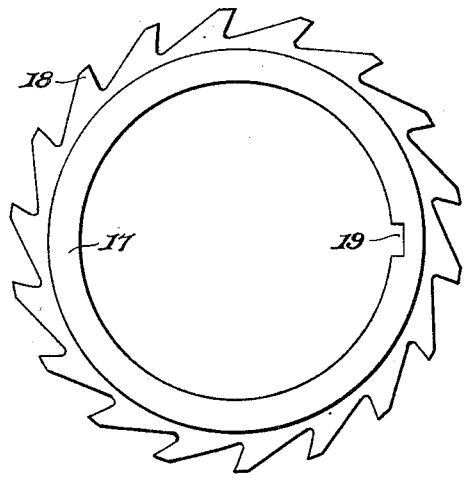
Figure 6:
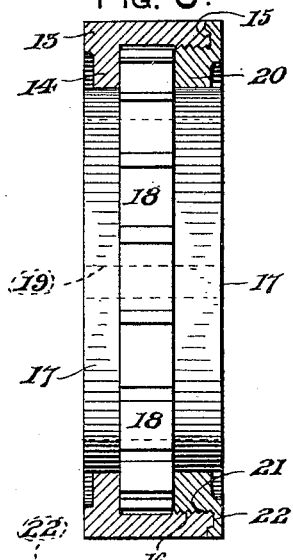
Figure 7:
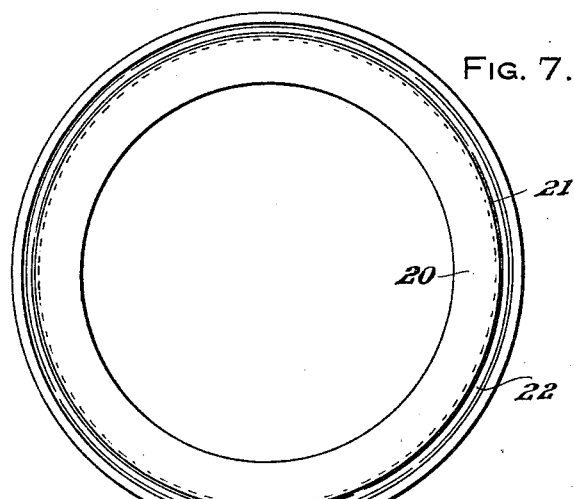
Figure 8:
Figure 9:
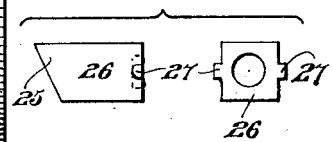
Figure 10:
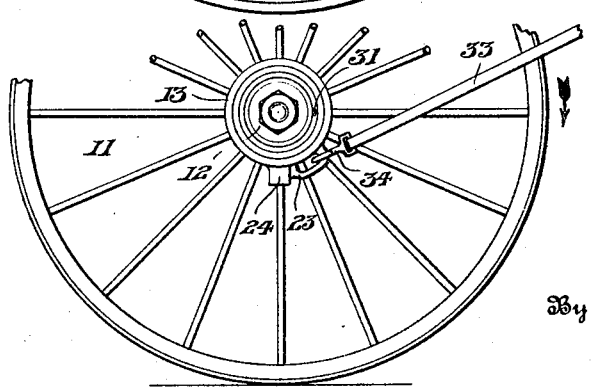

In the drawings,

Figure 1 is a side elevational view of a horse hitching device constructed in accordance with the present invention and in operative position upon the wheel hub, a portion thereof being broken away to show the ratchet mechanism with the hub of the wheel shown in section to illustrate the connection between the hitching device and the hub, said view being taken on line I—I of Fig. 2, Fig. 2 is a front elevational view thereof in operative position upon a wheel hub, parts thereof being broken away, Fig. 3 is a side elevational view of the outer casing of the hitching device, Fig. 4 is an end elevational view of the casing shown in Fig. 3 with the closure plug and ratchet block removed therefrom, Fig. 5 is a side elevational view of the ratchet wheel removed from the device, Fig. 6 is a vertical sectional view through the outer casing showing the ratchet wheel in elevation and the manner of securing the same in position, Figs. 7 and 8 are front and end elevations respectively of the screw ring for retaining the ratchet wheel in position, Fig. 9 shows side and end view of the ratchet pawl and Fig. 10 is a side elevational view of the present invention in operative position upon the hub of a wheel, a portion of the wheel being broken away.

Referring more in detail to the accompanying drawings, the reference numeral 11 designates a wheel having the usual hub 12 adapted to receive the horse hitching device as illustrated.

The hitching device includes a ring or casing 13 having an inwardly directed annular flange 14 at one side thereof while the opposite side face of said ring or casing 13 is provided with a rib 15 and with a screw thread 16 formed upon the inner face thereof adjacent said rib. A ratchet wheel including laterally projecting hub portions 17 is provided with centrally and radially positioned ratchet teeth 18 and has a key slot 19 upon the inner face of the flanges 17. As more clearly shown in Fig. 6, the ratchet wheel is positioned in the casing 13 with the inwardly directed flange 14 loosely engaging the adjacent ratchet wheel flange 17 with the inner face of the flange 14 in sliding abutting relation with the side faces of the ratchet teeth 18. To hold the ratchet wheel in position in the casing 13, there is provided a retaining ring 20 shown more clearly in Figs. 6, 7, and 8 and includes a reduced externally threaded section 21 that is adapted to engage the threads 16 upon the casing 13 while the rib 15 is received into the annular groove 22 upon the adjacent face of the ring 20 while the inner face of the ring freely engages the adjacent flange 17 of the ratchet wheel.

As shown more clearly in Figs. 1 and 2, an apertured ear 23 is formed integral with the casing 13 and has an enlarged socket member 24 preferably formed integral therewith at the lower side thereof, said socket member also being formed integral with the casing 13, the inner end of the socket opening at the inner face of the casing 13 so that the projecting nose 25 upon the ratchet member 26 projects through said opening as shown in Fig. 1 to engage the ratchet teeth 18. The ratchet member 26 is guided in its sliding movements by lateral lugs 27 slidably positioned in the guides 28 in the side wall of the socket 24, the socket and ratchet member being preferably rectangular in cross section to prevent rotary movement of said ratchet member. An expansion coil spring 29 is positioned in the outer end of said socket 24 and has the inner end thereof in engagement with the outer end of the ratchet member 26 while the outer end of said spring is engaged by the threaded closure plug 30 for the circular outer end of the socket 24.

In positioning the casing 13 and coöperating parts upon the wheel hub 12, the key slot 19 in the flanges 17 of the ratchet wheel are fixed to the hub 12 by the key 31 entering a corresponding key slot in said hub while the casing 13 is prevented from axial movement upon said hub by the retaining bands 32. When so arranged, a hitching strap 33 carrying a snap fastener 34 is connected with the apertured ear 23 while the opposite end of the hitching strap is preferably connected to the bridle of the harness. In the usual operation of the vehicle, the snap fastener 34 is attached over the apertured ear 23 and the casing 13 and coöperating parts revolve with the wheel 11. When it is desired to leave the vehicle and the horse standing, it is intended that the strap 33 be connected to the apertured ear 23 and any forward movement of the vehicle will cause the ratchet wheel 17 to engage the ratchet member 26 thereby to move the casing 13 and apertured ear 23 in a similar direction and rearwardly draw the hitching strap 33 and cause a pull upon the head of the horse. With the strap in position shown in Fig. 10, the vehicle will be permitted to move rearwardly as the ratchet member 26 and casing 13 supporting the same will ride over the ratchet teeth 18.

While the form of the invention herein shown and described is what is believed to be the preferable embodiment thereof, it is nevertheless to be understood that minor changes may be made therein without departing from the spirit and scope of the invention as claimed.

What I claim as new is:

1. A horse hitching device comprising a casing, a ratchet wheel rotatably arranged therein, a retaining ring for said ratchet wheel detachably connected to said casing, a key connection between the ratchet wheel and a supporting hub, a spring pressed pawl carried by said casing in engagement with said ratchet wheel adapted to lock said casing to said ratchet wheel for movement in one direction and a hitching strap connected to said casing.

2. A horse hitching device comprising a casing having an inwardly directed flange at one side thereof, a ratchet wheel embodying opposite flanges received in said casing with one flange freely engaged by said casing flange, a retaining ring threaded into the opposite side of said casing with the inner face thereof freely engaging the adjacent ratchet wheel flange and means carried by said casing for locking the same to said ratchet wheel for movement in one direction.

3. A horse hitching device comprising a casing having an inwardly directed flange at one side thereof, a ratchet wheel embodying opposite flanges received in said casing with one flange freely engaged by said casing flange, a retaining ring threaded into the opposite side of said casing with the inner face thereof freely engaging the adjacent ratchet wheel flange, a socket member formed integral with said casing having a rectangular portion, a rectangular ratchet member slidably received in the rectangular portion of said socket adapted for engagement with the ratchet teeth.

4. A horse hitching device comprising a casing having an inwardly directed flange at one side thereof, a ratchet wheel embodying opposite flanges received in said casing with one flange freely engaged by said casing flange, a retaining ring threaded into the opposite side of said casing with the inner face thereof freely engaging the adjacent ratchet wheel flange, a socket member formed integral with said casing having a rectangular portion, a rectangular ratchet member slidably received in the rectangular portion of said socket adapted for engagement with the ratchet teeth, a closure upon the outer end of said socket and resilient means arranged between said closure and adjacent end of said ratchet member.

In testimony whereof I affix my signature

JOSEPH K. SKINDER